United States Patent [19]
Kummermehr

[11] Patent Number: 5,879,793
[45] Date of Patent: Mar. 9, 1999

[54] MINERAL WOOL PRODUCT, METHOD FOR ITS PRODUCTION, IMPREGNATING MASS THEREFOR, AND USE THEREOF

[75] Inventor: Hans Kummermehr, Ludwigshafen, Germany

[73] Assignee: Isover Saint-Gobain, Courbevoie, France

[21] Appl. No.: 646,864

[22] Filed: May 8, 1996

Related U.S. Application Data

[63] Continuation of PCT/EP94/03736 Nov. 11, 1994.

[30] Foreign Application Priority Data

Nov. 11, 1993 [DE] Germany .......................... 43 38 619.9
Oct. 7, 1994 [DE] Germany .......................... 44 35 918.7

[51] Int. Cl.$^6$ ................................ B32B 3/08; B32B 5/14; B32B 5/18
[52] U.S. Cl. ...................................... 428/306.6; 438/307.7; 438/311.51; 438/317.1; 438/317.7; 438/921
[58] Field of Search .............................. 428/306.6, 307.3, 428/307.7, 311.51, 317.1, 317.7, 921

[56] References Cited

U.S. PATENT DOCUMENTS

| | | |
|---|---|---|
| 4,376,142 | 3/1983 | Allen . |
| 4,572,865 | 2/1986 | Gluck et al. .......................... 428/309.9 |
| 4,764,420 | 8/1988 | Gluck et al. .......................... 428/317.7 |

FOREIGN PATENT DOCUMENTS

| | | |
|---|---|---|
| 114965 | 10/1985 | European Pat. Off. . |
| 2514043 | 4/1983 | France . |
| 3248661 | 7/1984 | Germany . |
| 4215468 | 11/1993 | Germany . |

OTHER PUBLICATIONS

Chemical Abstracts, vol. 107, No. 14 Abstract No. 120045t, Oct. 1987, 1 page.

*Primary Examiner*—Marion E. McCamish
*Assistant Examiner*—Blaine R. Copenheaver
*Attorney, Agent, or Firm*—Cushman, Darby & Cushman IP Group of Pillsbury Madison & Sutro LLP

[57] ABSTRACT

A mineral wool article including a mineral wool layer, at least a region of which extends from at least one surface of the mineral wool layer into the mineral wool layer to an impregnation depth t. The region of the mineral wool layer includes individual fibers and is impregnated with an impregnating substance which adheres to the fibers and encloses the fibers without sealing gaps defined between the fibers so as to permit the surface of the mineral wool layer to retain an open surface structure. The gaps between the fibers in the region include bridge formations of the impregnating substance, which bridge formations are configured to permit air to penetrate through the mineral wool layer without essentially being impeded and to trap solid particles and thereby prevent emergence of the particles from the surface of the mineral wool layer. The impregnating substance provides the article with a soft and warm touch.

16 Claims, 2 Drawing Sheets

MINERAL WOOL PRODUCT, METHOD FOR ITS PRODUCTION, IMPREGNATING MASS THEREFOR, AND USE THEREOF

This application is a continuation of PCT/EP94/03736 filed Nov. 11, 1994 which designated the U.S.

BACKGROUND OF THE INVENTION

The invention concerns a mineral wool article comprising an impregnating layer on at least one surface thereof, which is located substantially in the region 10 within the mineral wool adjacent the product surface, whereby said impregnating substance adheres to the individual fibers of said mineral wool product within a region that is defined by the impregnation depth, such as to enclose the fibers without sealing the gaps between them, allowing the fibrous surface to retain an open surface structure. It furthermore concerns a particulary suitable method for its production and a further use of the impregnating mass.

DESCRIPTION OF THE RELATED ART

Mineral wool products comprising a coating or impregnating layer at the surface essentially within the region adjacent the product surface are, for example known from EP 0 114 965 B1. In the known case, these are insulating panels for the front surfaces of supporting structures or for roofs, which require a coating or impregnating layer in order to be able to serve as plaster-bearing panels or to prevent the penetration of bitumen into the panel. This simultaneously results in a strengthening of the coated or impregnated surface and in a certain effect of sealing the surface due to the coating or impregnating layer.

Coating or impregnating layers intended for specific purposes present properties which are adapted to these respective purposes of use and modify the surface of the mineral fiber product. Such products are therefore unacceptable for uses not requiring such a coating or impregating layer. In such a case, the user would reject a product nevertheless coated, not only for technological reasons, but also because of the considerably higher price related to the coating or impregnating layer.

Uncoated mineral wool products, on the other hand, resent an open surface structure through which for example, unfiberized material (beads) and dust from the product interior may pass to the outside, particularly if the product is, for instance, compressed during handling. Such release of loose matter may be found to be irritating, for example by hobby workers processing the material.

FR-A-2 514 043 disclose a fiber product consisting of in particular mineral fibers and having an impregnation substance on its surface which includes a fluid solvent. After evaporation of the solvent, the impregnation substance is exclusively located at the fibers, enclosing them, but leaving the interstices free. Thus, the porosity is approximately the same as the porosity of the material without impregnation substance.

Such an impregnation improves the mechanical properties of the fiber product, but it is not able to prohibit a release of, for example unfiberized material (beads) and dust from the product interior, as the porosity is nearly the same as the porosity of the unimpregnated material.

SUMMARY OF THE INVENTION

In view thereof, it is an object of the present invention to create a mineral wool product having such an impregnating layer which does not modify the surface structure in an unacceptable manner compared with the uncoated or unimpregnated product and yet forms a barrier against trickling particles and dust, and can be realized in large-series production without excessively raising the cost of the product.

This object is achieved in that in the region between the fibers, bridge formations of impregnating material resembling spider webs are provided.

A mineral wool product attaining this object is obtainable by applying an impregnating mass containing a carrier fluid for the purpose of its application, by working the impregnating mass into the product surface and subsequently drying the impregnating mass in order to volatilize the carrier fluid if the impregnating mass is foamed prior to its application.

Hereby it is achieved that the foam mass foamed to the five- or sixfold volume and having a very low apparent density easily penetrates into the surface of the mineral wool product and entirely encloses the fibers there without exerting any essential mechanical forces on them. The loose foam mass may gently be impressed into the surface to a depth which is essentially determined by the thickness of the impressed foam layer, for example with a doctor blade. Even providing an impregnating layer on a single major surface may be of interest as a barrier against trickling particles for several applications, such as overhead assembly. For the purpose of providing an impregnating layer on both major surfaces, the mineral wool product, for example provided in the form of a felt may subsequently be turned over and impregnated on its opposite major surface in the same manner. If the front surfaces are to be impregnated, as well, it is best to provide them with impregnating mass by an immersion process in which the respective edge of the felt web to be impregnated is dipped into the foam. As a matter of course, all of these surfaces can be impregnated in this or another, however identical way. All of these processes can be managed well in terms of production technology, also in large-series production, and may thus reliably be implemented without incurring any excessive additional costs.

During drying or curing, the applied foam degenerates in such a manner that the foam bubbles burst by and by, with the impregnating mass thus released from areas in between the individual fibers attaching to the fibers by adhesion and coating them. Depending on the consistency of the impregnating mass, bridges of impregnating material may still span gaps between neighboring fibers, however in any case pore-like openings between the fibers are opened.

Due to the considerable increase in volume, wetting and impregnating the surface of the mineral wool product can be realized by means of a very small amount of impregnating mass, resulting in considerable savings of raw material and overall production costs compared with conventional coating layers. In addition there is a reduction of the drying time or of the required drying capacities, further supporting low-cost production. Where the impregnating mass also introduces substances not desirable under certain viewpoints, their amount is correspondingly reduced, thus resulting in a correspondingly reduced expense for neutralizing possible undesirable effects. When using organic substances in the impregnating mass, for example, while it is necessary to obtain a good fire protection classification endangered by these, such as e.g. material class A2—fireproof construction materials—as specified by DIN 4102, the fire load is reduced due to reduction of the amount of the impregnating material and concurrent reduction of the amount of organic substances. Consequently, the use of fireproofing agents may be minimized or restricted to non-pollutant ones, e.g. fireproofing agents releasing nitrogen or water.

This impregnating layer, which consequently can also be introduced into large-series production at relatively low additional costs, in any case results in an open surface structure, however at a more or less strongly reduced pore size of the openings. Such a reduction is brought about already due to the simple fact that the fibers are enclosed by the impregnating mass, but additionally also through the bridges of impregnating material remaining at individual locations between neighboring fibers located at a distance from each other after the carrier fluid has dried. In conjunction with the quite considerable impregnating layer depth of at least several millimeters, an effect similar to that of a labyrinth seal results from the random fiber orientations: whereas air may penetrate through the impregnating layer without essentially being impeded, solid matter on its passage through the impregnating layer will meet a plurality of obstacles and in all probability be trapped before emerging at the surfaces of the impregnating layer. In this manner, the impregnating layer forms an effective barrier against dust and trickling particles.

Furthermore the impregnating layer also brings about a change in the consistency of the product surface, which may be useful for many applications. Thus in any case there results a more or less distinct mechanical strengthening of the mineral wool surface, and thereby an increased resistance to wear and erosion. Even if such additional effects by themselves frequently would not be worthwhile the additional expense for producing a product according to the invention, it can be of interest to utilise them once the product is available.

Where the coloration of the impregnating layer is adapted to the coloring of the mineral wool, the former is hardly conspicuous to the eye, particularly as it is for the overwhelming part arranged underneath the top fiber layers of the mineral wool product and therefore hidden. Consequently the risk of lacking acceptance by individual first users is low. On the other hand, however, even with first users acceptancy may be increased and the positive value of recognition by experienced users may be improved through an agreeable color design of the impregnating layer itself.

It is of quite particular importance that the impregnating material in any case encloses practically all of the fibers on the surface. These are therefore provided with a coating that may strongly modify the tactile behavior in a desired manner if the impregnating material is aptly chosen. In analogy to the known case for example of plastic-coated metal, a tactile impression if necessary entirely different from mineral materials such as glass may be created, such as a softer and—due to a lower coefficient of heat transfer to skin—warmer tactile sensation which altogether is judged to be more agreeable. As agreeable gripping properties are desired particularly with mineral wool products, this aspect gains a particular importance also independently from the function of a barrier against dust and trickling particles.

DESCRIPTION OF THE DRAWINGS

Further details, features, and advantages of the invention can be seen from the following description of an embodiment by reference to the drawings, in which.

DETAILED DESCRIPTION OF THE INVENTION

Figure 1:
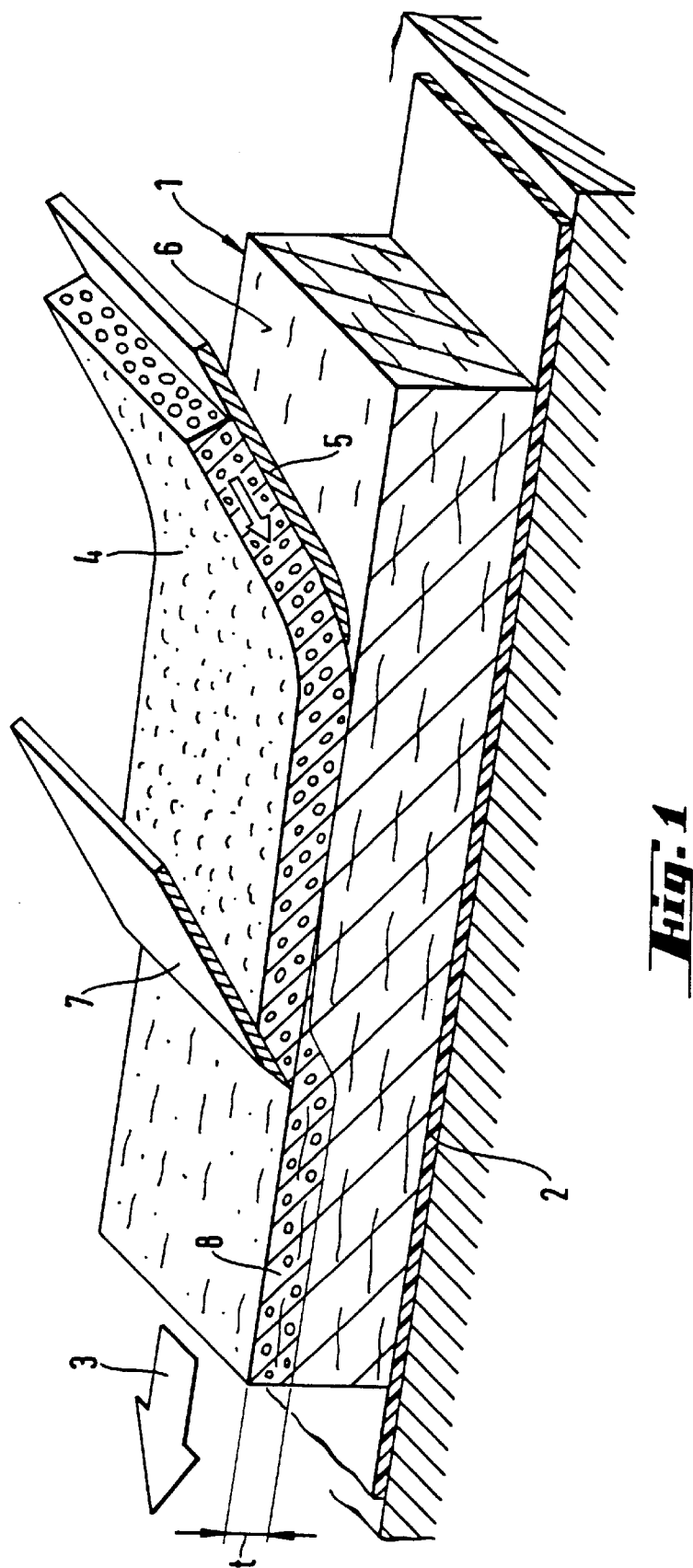
FIG. 1 shows a schematic representation of the process of introducing the foamed impregnating mass into the surface of a mineral wool article.

The foam of an impregnating mass containing a carrier fluid such as water may be produced through foaming by blowing gas as is known per se. Preferably, the foam according to the invention is, however, produced mechanically according to the mechanical frothing method or by means of dissolver disks. Herein a spreadable foam is formed by beating in air and may be applied to the product surface and gently worked into the product surface by pressure. The carrier fluid such as water, which volatilises later on, also has the purpose of lowering the viscosity of the impregnating mass to such a degree that mechanical frothing by the mechanical frothing method by means of dissolver disks is facilitated.

The mixture of substances preferably used for the impregnating mass to be applied is an aqueous mixture of a siliceous binding agent such as particularly silica sol (colloidal silicic acid), plastic dispersion, foaming agent and foam stabilizing agent, which may contain a fireproofing agents and further additives if necessary. Due to the plastic dispersion, which may be added in a considerable amount, namely in the same range as the basic component (siliceous binding agent), the brittleness of the dried or cured impregnating layer is clearly reduced and an elastically resilient behavior of the layer is produced. It appears that herefor plastic particles penetrate in between the $SiO_2$ particles and enable their elastic relative mobility. Such elasticity of the layer is very important for agreeable gripping properties of the product and moreover prevents the impregnating layer from being damaged, e.g. in the area of the corners, while the product is handled.

A variety of products may serve as the plastic dispersion. Particularly preferred in the framework of the present invention is Bayceram® of Bayer AG, a polyester/polyurethane dispersion satisfying the described characteristics and conferring particularly good elasticity. Good results were also achieved with Vinnapas® Dispersion EP177 of Wacker-Chemie, a vinyl acetate and ethylene copolymer, and with Mowilith® Dispersion DM132 of Hoechst AG, a thermoplastic synthetic resin, however restricted to applications not requiring good water resistance in the case of Mowilith® as Mowilith® adsorbs up to 20% (wt.) water.

The relatively high proportion of plastic dispersion results in an increased fire load, which may pose a problem with applications requiring classification into a good fire protection class such as material class A2 (fireproof) as specified by DIN 4102. In such a case, addition of fireproofing agents is frequently recommendable.

In accordance with an embodiment of the foamed impregnating mass used in accordance with the invention, it contains:

| | |
|---|---|
| 10 to 30% (wt.) | silica sol (40% (wt.) content of solid $SiO_2$) |
| 15 to 30% (wt.) | plastic dispersion |
| 0.3 to 1.5% (wt.) | foaming agent |
| 0.05 to 1.5% (wt.) | foam stabilizing agent |
| | fireproofing agent as required |
| balance | water. |

The amount of applied coating or impregnating mass conventionally is approximately 300 g/m² (dry) for usual applications, for example as a plaster-bearing layer for insulating panels for structure fronts. According to the invention, this amount may be specified to be much lower.

Thus the amount of impregnating mass applied according to the invention is in the range between 10 and 100 g/m² (dry). As a general rule, an applied amount of 20 to 60 g/m² (dry), particularly from 30 to 50 g/m² (dry) is sufficient according to the present invention. For usual applications, applied amounts in the range of 30 g/m² or slightly more are typical for the present invention. The above numeric indications relate to the weight of dried impregnating material.

Such a foamed impregnating mass is suited not only for production of thus equipped mineral wool products by manufacturers, but can also be used for subsequent coating or impregnating of mineral wool products which initially were purchased without such an impregnating layer. Such subsequent impregnation can be useful for a variety of reasons, however, the invention gains particular importance in connection with reforming mineral wool surfaces e.g. threatened by erosion and delaminations. Here, too, a corresponding strengthening of the surface may be effected by working in and drying such a foamed impregnating mass, which in view of the properties of the foam allowing easy introduction even in situ does not create any difficulties. For instance, a mineral wool insulating layer behind rear-ventilated claddings of a structure front of an industrial building can in this manner be secured against delaminations and erosion by wind forces and refurbished even after a long service life.

EXAMPLE

| | |
|---|---|
| 16% (wt.) | silica sol (40% (wt.) solid content SiO₂) |
| 12% (wt.) | BACO SF4 (aluminum hydroxide) as a fireproofing agent |
| 12% (wt.) | Luvogard (phosphoric acid ester) as a fireproofing agent |
| 20% (wt.) | Bayceram ® (polyester/polyurethane dispersion of Bayer AG, water content 50%) |
| 1% (wt.) | W53 foaming agent of Zschimmer & Schwarz |
| 1% (wt.) | PS1 foam stabilizing agent of Zschimmer & Schwarz |
| balance | water |

This impregnating mass was frothed, by means of an agitator, to the sixfold of the volume prior to frothing and applied on the surface of a mineral wool panel and introduced therein by means of a doctor blade. Afterwards a panel thus coated was shortly cured in a through-type furnace. The foam structure decomposes during curing. This brought about a fine distribution of the impregnating mass in a layer region adjacent the surface of the mineral wool panel. The foamed impregnating mass was applied in an amount of approx. 50 g/m² and penetrated into the panel surface at a layer depth of about five millimeters and enclosed the fibers adjacent the surface within the penetrating depth. The open surface structure of the panel was preserved.

As a fireproofing agent, a combination of phosphoric acid ester and aluminum hydroxide is used. Phosphoric acid ester is considerably more expensive than aluminum hydroxide, however, at the same time it serves as a softener for the impregnating material. It follows that where a reduced brittlenes and an improved elasticity of the impregnating layer is required, the proportion of phosphoric acid ester in the fireproofing agent may be increased; otherwise it is kept low to minimize costs.

The dried impregnating mass of the finished panel was provided in an amount of approx. 30 g/m² and presented the following composition:

21.1% (wt.) silica (solid content SiO₂)
26.3% (wt.) BACO SF4 (aluminum hydroxide)
26.3% (wt.) Luvogard (phosphoric acid ester)
21.9% (wt.) Bayceram®
2.2% (wt.) W53 foaming agent
2.2% (wt.) PS1 foam stabilizing agent FIG. 1 shows a schematic representation of how a mineral wool product 1 having the form of a mineral wool felt on a production conveyor 2 is moved, in the course of its production, in the direction of an arrow 3. By means of a frothing device not represented here, impregnating mass has been frothed and charged on an application device 5 in the form of a foam layer 4. The foam layer 4 on the surface 6 of the mineral wool product 1 is carried along by the mineral wool product 1 in the direction of arrow 3 and brought into the work area of a doctor blade 7. Upstream of the doctor blade 7, the foam of the foam layer 4 penetrates only slightly into the surface 6 of the mineral wool product because the foam layer 4 has only a very slight weight. Only through the pressure of the doctor blade 7 the foam layer 4 is pressed into the surface 6 of the mineral wool product 1, with a certain uniform penetrating depth t resulting in accordance with the consistency of the foam layer 4 and the surface 6 of the mineral wool product 1, with this penetrating depth—just like the thickness of the foam layer 4—being shown exaggeratedly large in the representation according to FIG. 1 for the purpose of clarity. As the doctor blade 7 has to exert only little pressure on the foam layer 4 in order to impress it into the surface 6, and as the doctor blade 7 furthermore only lightly touches the surface 6, if at all, the structure of the surface 6 is practically not modified by impression of the foam layer 4.

Downstream of the doctor blade 7, the foam layer 4 impressed into the surface 6 forms an impregnating layer designated as 8, with the largely intact foam completely enclosing and wetting the fibers in the region of the surface 6, and sealing the previous openings in the surface 6 between the fibers. In the course of drying or curing the impregnating layer 8, however, the foam bubbles burst and the impregnating mass concentrates on the individual fibers, with remainders of the previous three-dimensional foam structure between the fibers.

Figure 2:
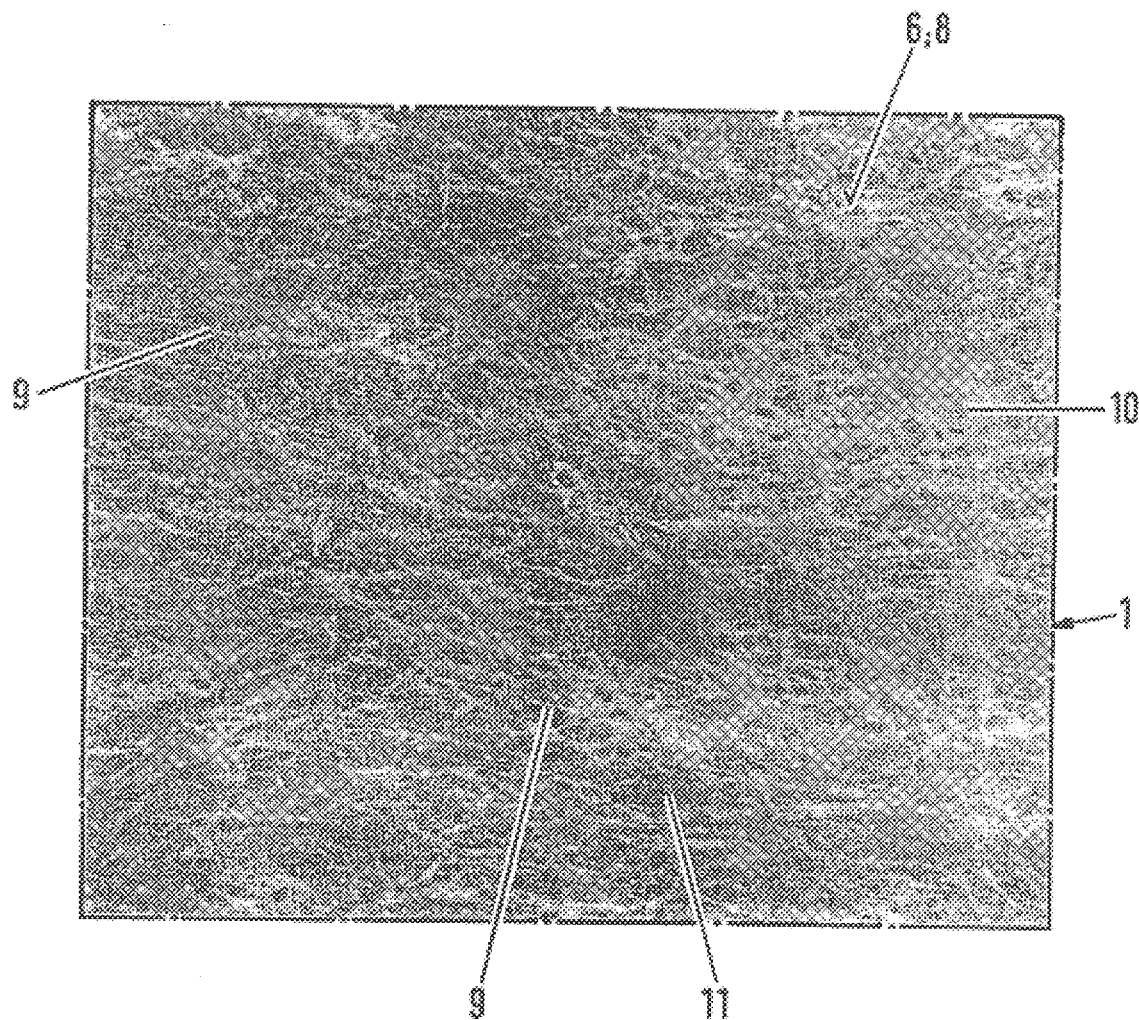
FIG. 2 shows a pictorial representation of a coated surface of the mineral wool article obtained by the process of FIG. 1.

A consistency of the coated surface resulting exemplarily can be seen in FIG. 2, representing a top view of the impregnating layer 8 after drying or curing. Clearly discernible are the mineral fibers 9 adjacent the surface which are enclosed by impregnating mass. At the surface in the region between the fibers, bridge formations 10 of impregnating material resembling spider webs are partly discernible, between which, however, in any case, pores 11 of quite considerable size remain, such that the open structure of the surface is preserved.

The impregnating layer 8 well allows the passage of air, but in a sense presents a filter layer for solid matter carried along by it. In comparison with an uncoated embodiment of the surface region of the mineral wool product 1, the pores 11 are reduced in size and surrounded by the surface of the impregnating material, so that with respect to the relatively large penetrating depth of the impregnating mass and their staggered arrangement due to random fiber orientations, the pores may function in the manner of a labyrinth seal to trap particles.

The tactile impression of the surface 6 is then determined almost exclusively by the impregnating layer, because the skin of a person touching it does not get into contact with uncoated mineral fiber material.

Particularly on the side or front surfaces of the mineral wool product 1, forming an impregnating layer by immersing the edge of the product into a foam layer may be more recommendable than introduction by doctor blade as represented in FIG. 1. Apart from the fact that greater layer depths t may be achieved by means of doctor blade introduction, the results of either method are not noticeably different, such that the representation in FIG. 2 is also representative of an impregnating layer applied by immersion.

I claim:

1. A mineral wool article comprising a mineral wool layer, at least a region of which extends from at least one surface of said mineral wool layer into said mineral wool layer to an impregnation depth t, said region of said mineral wool layer including individual fibers and being impregnated with an impregnating substance which adheres to said fibers and encloses said fibers without sealing gaps defined between said fibers so as to permit said surface of said mineral wool layer to retain an open surface structure, wherein said gaps between said fibers in said region include bridge formations of said impregnating substance.

2. A mineral wool article according to claim 1, wherein said mineral wool article has a plurality of surfaces, each of which includes at least one of said regions impregnated with said impregnating substance.

3. A mineral wool article according to claim 1, wherein said region includes at least one inorganic siliceous binding agent and at least one plastic material.

4. A mineral wool article according to claim 3, wherein said inorganic siliceous binding agent is silica.

5. A mineral wool article according to claim 1, wherein said region includes a fireproofing agent.

6. A mineral wool article according to claim 1, wherein said mineral wool article forms part of a supporting structure.

7. A mineral wool article according to claim 6, wherein said supporting structure is a rear-ventilated cladding element.

8. A mineral wool article according to claim 1, wherein said bridge formations are configured to permit air to penetrate through said mineral wool layer without essentially being impeded and to trap solid particles and thereby prevent emergence thereof from said surface of said mineral wool layer.

9. A mineral wool comprising:

a mineral wool layer, at least a region of which extends from at least one surface of said mineral wool layer into said mineral wool layer to an impregnation depth t; and an impregnating mass impregnated into said region of said mineral wool layer by introducing said impregnating mass and a carrier fluid into said mineral wool layer through said surface and drying said impregnating mass to thereby volatilize said carrier fluid, wherein said impregnating mass is foamed prior to application, and wherein said region of said mineral wool layer includes individual fibers and is impregnated with an impregnating substance of said impregnating mass which adheres to said fibers and encloses said fibers without sealing gaps defined between said fibers so as to permit said surface of said mineral wool layer to retain an open surface structure, wherein said gaps between said fibers in said region include bridge formations of said impregnating substance.

10. A mineral wool article according to claim 9, wherein said mineral wool article has a plurality of surfaces, each of which includes at least one of said regions impregnated with said impregnating substance.

11. A mineral wool article according to claim 9, wherein said region includes at least one inorganic siliceous binding agent and at least one plastic material.

12. A mineral wool article according to claim 11, wherein said inorganic siliceous binding agent is silica.

13. A mineral wool article according to claim 9, wherein said region includes a fireproofing agent.

14. A mineral wool article according to claim 9, wherein said mineral wool article forms part of a supporting structure.

15. A mineral wool article according to claim 14, wherein said supporting structure is a rear-ventilated cladding element.

16. A mineral wool article according to claim 9, wherein said bridge formations are configured to permit air to penetrate through said mineral wool layer without essentially being impeded and to trap solid particles and thereby prevent emergence thereof from said surface of said mineral wool layer.

\* \* \* \* \*